(12) United States Patent
Strouse et al.

(10) Patent No.: US 7,575,699 B2
(45) Date of Patent: *Aug. 18, 2009

(54) METHOD FOR SYNTHESIS OF COLLOIDAL NANOPARTICLES

(75) Inventors: Geoffrey Fielding Strouse, Tallahassee, FL (US); Jeffrey A. Gerbec, Goleta, CA (US); Donny Magana, Madera, CA (US)

(73) Assignee: The Regents of the University of California, Oakland, CA (US)

( * ) Notice: Subject to any disclaimer, the term of this patent is extended or adjusted under 35 U.S.C. 154(b) by 369 days.

This patent is subject to a terminal disclaimer.

(21) Appl. No.: 11/103,159

(22) Filed: Apr. 11, 2005

(65) Prior Publication Data

US 2006/0060998 A1 Mar. 23, 2006

Related U.S. Application Data

(63) Continuation-in-part of application No. 10/945,053, filed on Sep. 20, 2004.

(51) Int. Cl.
*B29B 9/00* (2006.01)
*B29C 67/00* (2006.01)

(52) U.S. Cl. .......................................... 264/5; 264/489
(58) Field of Classification Search ................ 264/5, 264/489
See application file for complete search history.

(56) References Cited

U.S. PATENT DOCUMENTS

| | | | | |
|---|---|---|---|---|
| 5,716,565 | A * | 2/1998 | Stangle et al. | 264/681 |
| 6,136,287 | A * | 10/2000 | Horne et al. | 423/599 |
| 6,607,706 | B1 * | 8/2003 | Kumar et al. | 423/599 |
| 6,680,041 | B1 * | 1/2004 | Kumar et al. | 75/330 |
| 6,752,979 | B1 * | 6/2004 | Talbot et al. | 423/592.1 |
| 2004/0009118 | A1 | 1/2004 | Phillips et al. | |

OTHER PUBLICATIONS

D. Battaglia et al., "Formation Of High Quality Inp And Inas Nanocrystals In A Noncoordinating Solvent," Nano Letters 2002, 2(9):1027-1030.

Chan, E.M. et al., "Size-Controlled Growth of CdSe Nanocrystals in Microfluidic Reactors,"2003, Nano Letters, 3(2):199-201.

Chiappe, C. et al., "Ionic liquids: solvent properties and organic reactivity,"J. Phys. Org. Chem., 2005, 18:275-297.

Cumberland, S.L. et al., "Inorganic Clusters as Single-Source Precursors for Preparation of CdSe, ZnSe and CdSc/ZnS Nanomaterials," Chemistry of Materials 2002, 14:1576-1584.

Ding, T. et al., "Synthesis of HgS and PbS nanocrystals in a polyol solvent by microwave heating," 2003, Microelectronic Engineering, 66:46-52.

(Continued)

*Primary Examiner*—Wayne Langel
(74) *Attorney, Agent, or Firm*—Gates & Cooper LLP

(57) ABSTRACT

A method for synthesis of high quality colloidal nanoparticles using comprises a high heating rate process. Irradiation of single mode, high power, microwave is a particularly well suited technique to realize high quality semiconductor nanoparticles. The use of microwave radiation effectively automates the synthesis, and more importantly, permits the use of a continuous flow microwave reactor for commercial preparation of the high quality colloidal nanoparticles.

8 Claims, 7 Drawing Sheets

OTHER PUBLICATIONS

Gabriel, C. et al., "Dielectric Parameters Relevant To Microwave Dielectric Heating,"Chemical Society Reviews 1998, 27:213-223.

Grisaru, H. et al., "Preparation Of The $Cd_{1-x}Zn_xSe$ Alloys In The Nanophase Form Using Microwave Irradiation," Journal of Materials Chemistry 2002, 12:339-334.

Guzelian, A.A. et al., "Synthesis Of Size Selected, Surface-Passivated Inp Nanocrystals," Journal of Physical Chemistry 1996, 100:7212-7219.

He, J. et al., "Preparation of CdS nanowires by the decomposition of the complex in the presence of microwave irradiation," 2002,Journal of Crystal Growth, 240:389-394.

Hong, E.H. et al., "Synthesis of Carbon Nanotubes Using Microwave Radiation," 2003, Advanced Functional Materials, 13(12):961-966.

Jones, D.A. et al., "Microwave heating applications in environmental engineering—a review," 2002, Resources, Conservation and Recycling, 34:75-90.

Landry, C.C., "Synthesis of Chalcopyrite Semiconductors and Their Solid Solutions by Microwave Irradiation," 1995, Chem. Mater., 7:699-706.

Leadbeater, N.E. et al., "A Study of the Ionic Liquid Mediated Microwave Heating of Organic Solvents," J.Org. Chem., 2002, 67:3145-3148.

Lee, C.K. et al., "Simple amphiphilic liquid crystalline N-alkylimidazolium salts. A new solvent system providing a partially ordered environment," Chem. Commun., 2000, 1911-1912.

Li, J.J. et al., "Large-Scale Synthesis of Nearly Monodisperse CdSe/CdS Core/Shell Nanocrystals Using Air-Stable Reagents via Successive Ion Layer Adsorption and Reaction," 2003,J. Am. Chem. Soc., 125:12567-12575.

Lidstrom, P. et al., "Microwave assisted organic synthesis—a review," Tetrahedron 57:9225-9283, 2001.

Mekis, I. et al.,"One-Pot Synthesis of Highly Luminescent CdSe/CdS Core-Shell Nanocrystals via Organometallic and "Greener" Chemical Approaches," 2003,J. Phys. Chem. B, 107:7454-7462.

Micic, O.I. et al., "Synthesis and Characterization of InP Quantum Dots," 1994,J. Phys. Chem., 98:4966-4969.

Micic, O.I. et al., "Snythesis And Characterization Of Inp, Gap, And $Gainp_2$ Quantum Dots," Journal of Physical Chemistry, 1995, 99:7754-7759.

Micic, O.I. et al., "Highly Efficient band-edge emission from InP quantum dots," Appl. Phys. Lett. 1996, 68(22):3150-3152.

Micic, O.I. et al., "Synthesis of extremely small InP quantum dots and electronic coupling in their disordered solid films," 2001, Applied Physics Letters, 78(25):4022-4024.

Murray, C.B. et al., "Synthesis and Characterization of Nearly Monodisperse CdE (E = S, Se, Te) Semiconductor Nanocrystallites," J. Am. Chem. Soc., 1993, 115:8706-8715.

Murugan, A.V. et al., "Microwave-solvothermal synthesis on nanocrystalline cadmium sulfide," 2001, Materials Chemistry and Physics, 71:98-102.

Peng, Z.A. et al., "Formation of High-Quality CdTe, CdSe, and CdS Nanocrystals Using CdO as Precursor," 2001, J. Am. Chem. Soc., 123:183-184.

Seddon, K.R. et al., "Influence of chloride, water, and organic solvents on the physical properties of ionic liquids," Pure Appl. Chem., 2000, 72(12):2275-2287.

Talapin, D.V. et al., "Etching of Colloidal InP Nanocrystals with Fluorides: Photochemical Nature of the Process Resulting in High Photoluminescence Efficiency," J. Phys. Chem. B, 2002, 106:12659-12663.

Talapin, D.V. et al., "Synthesis and surface modification of amino-stabilized CdSe, CdTe and InP nanocrystals," 2002, Colloids and Surfaces, 202:145-154.

Thostenson, E.T. et al., "Microwave processing: fundamentals and applications," 1999, Composites: Part A, 30:1055-1071.

Wada, Y. et al., "Microwave-assisted size control of CdS nanocrystallites," J. Mater. Che., 2001, 11:1936-1940.

Wang, H. et al., "Continuous synthesis of CdSe-ZnS composite nanoparticles in a microfluidie reactor," 2004, Chem. Commun., 48:48-49.

Wells, R.L. et al., "Synthesis of Nanocrystalline Indium Arsenide and Indium Phosphide From Indium Phosphide From Indium (III) Halides and Tris (Trimethylsilyl) Pnicogens. Synthesis, Characterization, and Decomposition Behavior of $I_3In•P(SiMe_3)_3$," Chemistry of Materials 1995, 7:793-800.

Welton, T., "Room-Temperature Ionic Liquids. Solvents for Synthesis and Catalysis," Chem. Rev., 1999, 99:2071-2083.

* cited by examiner

METHOD FOR SYNTHESIS OF COLLOIDAL NANOPARTICLES

CROSS REFERENCE TO RELATED APPLICATION

This application is a continuation-in-part and claims the benefit under 35 U.S.C. Section 120 of the following co-pending and commonly-assigned patent application:

Ser. No. 10/945,053, filed on Sep. 20, 2004, by Geoffrey F. Strouse, Jeffrey A. Gerbec, and Donny Magana, entitled METHOD FOR SYNTHESIS OF COLLOIDAL NANO-PARTICLES, attorneys' docket number 30794.111-US-U1, which application is incorporated by reference herein.

BACKGROUND OF THE INVENTION

1. Field of the Invention

The invention is related to chemical synthesis of nanoparticles, and more particularly, to the large-scale, safe, convenient, reproducible, energy-conserving synthesis of highly-dispersive inorganic nanoparticles with narrow size distribution.

2. Description of the Related Art (Note: This application references a number of different publications as indicated throughout the specification by one or more reference numbers within brackets, e.g., [x]. A list of these different publications ordered according to these reference numbers can be found below in the section entitled "References." Each of these publications is incorporated by reference herein.)

Over the past decade, numerous advances have been made in the synthetic procedures for formation and isolation of high quality inorganic nanoparticles. These materials are finding applications in a wide range of disciplines, including optoelectronic devices, biological tagging, optical switching, solid-state lighting, and solar cell applications. [1-11]

One of the major hurdles for industrialization of these materials has been the development of a reproducible, high quantity synthetic methodology that is adaptable to high throughput automation for preparation of quantities of >100's of grams of single size (<5% RMS) crystalline quantum dots of various composition to be isolated. [12-13]

The general synthetic approach for preparation of colloidal semiconductor nanoparticles employs a bulky reaction flask under continuous Ar flow with a heating mantle operating in excess of 240° C. The reaction is initiated by rapid injection of the precursors, which are the source materials for the nanoparticles, at high temperatures and growth is controlled by the addition of a strongly coordinating ligand to control kinetics. And to a more limited extent, domestic microwave ovens have been used to synthesize nanoparticles. [14-19] The high temperature method imposes a limiting factor for industrial scalability and rapid nanomaterial discovery for several reasons: (1) random batch-to-batch irregularities such as temperature ramping rates and thermal instability; (2) time and cost required for preparation for each individual reaction; and (3) low product yield for device applications.

While recent advances in the field have developed better reactants, including inorganic single source precursors, metal salts, and oxides; better passivants, such as amines and non-coordinating solvents; and better reaction technologies, such as thermal flow reactors; the reactions are still limited by reproducibility. Coupled to this problem is the lack of control over reaction times, which require continuous monitoring. In the case of III-V compound semiconductors, the synthetic pathways have rates of growth on the order of days, while in the case of II-VI's, size control is very difficult and depends on the ability to rapidly cool the reaction. In these cases, the reaction depends on heating rate, heat uniformity over the reaction vessel, stirring and rapid and uniform cool-down.

SUMMARY OF THE INVENTION

To overcome the limitation in the prior art described above, and to overcome other limitations that will become apparent upon reading and understanding the present specification, the present invention describes methods of chemical synthesis of nanoparticles, such as quantum dots, comprising a high temperature ramp process, warranting large-scale, safe, convenient, reproducible, and energy-efficient production.

In the present invention, inorganic nanoparticles are synthesized by a scheme that comprises heating of the reaction system. It has been found that the above mentioned limitation can be overcome by including a heating process with high ramping rate. Hence, the critical issues that distinguish the present invention are:

(1) a method for synthesizing nanoparticles that comprises a high temperature ramping rate during heating, (2) the above mentioned method wherein microwave irradiation is used for the heating process, (3) the above mentioned method wherein the dielectric constant of the main constituent element, which is the element that dominates the largest amount of molar ratio among the entire reactant, is 20 or lower, (4) the above mentioned method where the formation rates and growth processes are manipulated through microwave power, reaction temperature, or additives by control of the kinetic and thermodynamic barriers at the reactant, surface, or growing material;

(5) the above mentioned method wherein the formation rates of nanoparticles is enhanced by adding stoichiometric amounts of ionic liquids to the reaction medium; and (5) high crystallinity of the nanoparticles that is often achieved by employing the results of the present invention.

BRIEF DESCRIPTION OF THE DRAWINGS

Referring now to the drawings in which like reference numbers represent corresponding parts throughout.

DETAILED DESCRIPTION OF THE INVENTION

Figure 1:
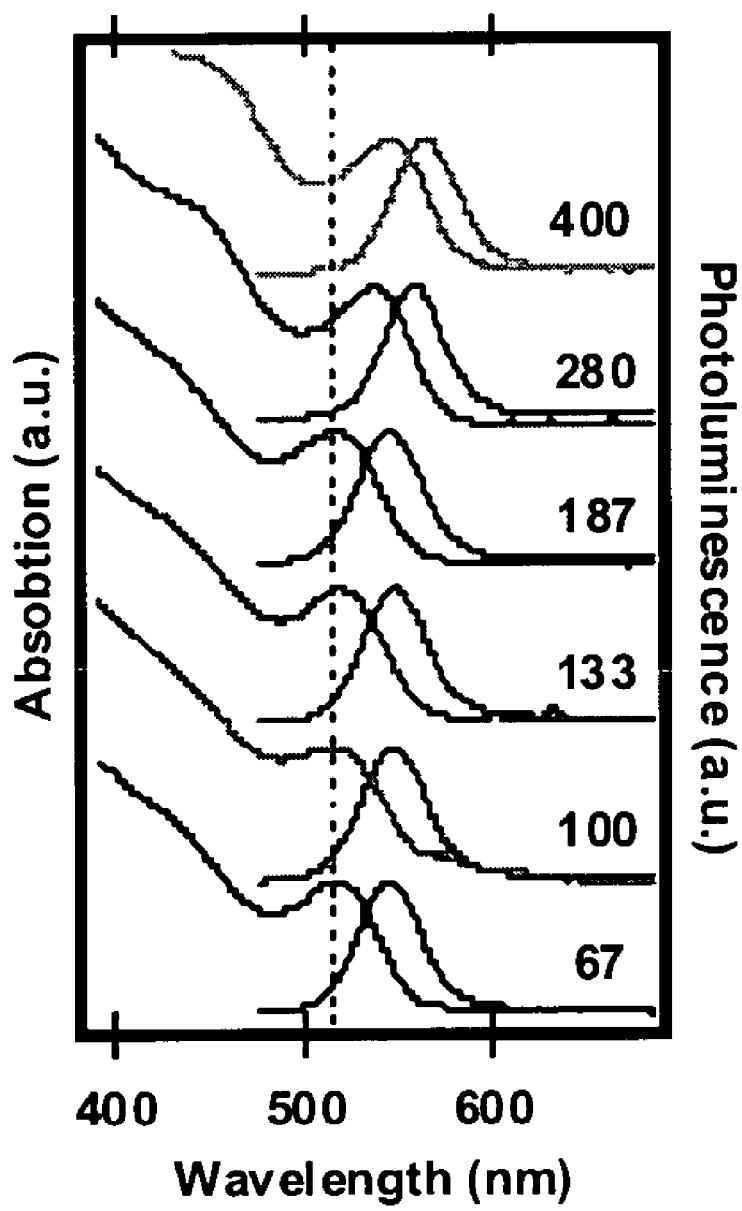
FIG. 1 is a graph that illustrates the absorption and photoluminescence for CdSe for a series of reactions containing the ionic liquid 1-hexyl-3-methylimidazolium chloride showing the formation rate dependence on applied power.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. The Reaction System

In the present invention, nanoparticles are synthesized by heating the reaction system from room temperature to elevated temperatures. The reaction system herein is a closed system that consists of materials that are necessary for the synthetic reaction. Each of these materials will hereafter be called a constituent element. In the most primitive reaction system, the sole constituent element is the precursor. However, in general, the constituent elements are solvent and precursor. The solvent can be a mixture of plural solvents, and also the precursor can be a mixture of plural precursors. These elements can either be dispersed homogeneously or inhomogeneously.

The constituent elements of the reaction system are mixed at or near room temperature and heated for nanoparticle synthesis. Here, near room temperature is below 100° C.

2. Heating and Cooling of the Reaction System

In the present invention, the temperature of the reaction system is typically monitored by devices such as thermometer, pyrometer, or thermocouples. The reaction described in the present invention comprise one or more of each of the (1) heating at a high heating rate, (2) stabilization at elevated temperature, and (3) cooling at a high cooling rate.

As a specific feature in one of the preferred embodiments, heating of the reaction system is performed by microwave irradiation. [20-23] The heating of the reaction system can either be achieved by sole use of microwave or with the aid of other heat sources such as oil-bath, mantle-heater, or burners. The frequency of the microwave is typically 2.45 GHz but not limited. Use of focused microwave is preferred over unfocused, and single-mode is preferred over multimode for efficient heating. Ramping the temperature of the reaction system up is done solely by microwave irradiation or microwave irradiation with the use of additional heat sources, during which the heating rate can be controlled by the input power of the microwave by a continuous or pulsed power supply. The average heating rate during each process of the synthesis is defined as:

(Temperature at the end of heating(° C.)−Temperature at the beginning of heating(° C.))/(Duration of heating (min))

The synthetic scheme described in the present invention comprises one or more stages of high heating rate. Here, high heating rate refers to a rate of 30° C./min or higher, more preferably 32° C./min or higher, most favorably 34° C./min or higher. When the average heating rate is below 30° C./min, synthesis may result in nanoparticulate materials with unfavorable properties such as lower dispersibility or wider size distribution.

During the stage where the temperature is stable at elevated temperature, heating by microwave irradiation with or without other heat sources is performed together with cooling by using means as flow of air or water, ice, oil or cryogenic gas, to balance the input/output of heat to/from the system to hold the temperature constant. When the heat capacitance of the reaction system is large enough such that the change in the temperature can be ignored, temperature stabilization may be achieved by merely leaving the system free of any heat input/output. Here, stable temperature refers to processes in which the temperature change is 5° C./min or less.

Cool-down of the reaction system can be achieved by removing heat from the system by standard means such as air, water, ice, oil or cryogenic gas. Microwave irradiation with or without other heat sources can be used to control this cool-down process. The average cooling rate of each cool-down process is defined as:

(Temperature at the beginning of cooling(° C.)−Temperature at the end of cooling(° C.))/(Duration of cooling (min))

The synthetic scheme described in the present invention comprises one or more stages of high cooling rate. Here, high cooling rate refers to a rate of 80° C./min or higher, more preferably 85° C./min or higher, most favorably 90° C./min or higher. When the average cooling rate is below 80° C./min, synthesis may result in nanoparticulate materials with unfavorable properties such as lower dispersibility or wider size distribution. Hereinafter, this high rate cooling process may be referred to as quenching. Hence, the simplest embodiment of the present invention for synthesizing nanoparticles comprise of three stages that are high-rate heating, temperature stabilization, and high-rate cooling.

3. Additives to the Reaction System

Selective heating of microwave absorbing materials allows rapid heating rates and high temperatures to be reached driving chemical reactions, a critical condition for nuclei formation in the nanomaterial formation process. In addition, they can overcome thermodynamic barriers in the reaction trajectory allowing larger nanoparticles to be grown. Additives, including polar and ionic molecules such as organic salts (or ionic liquids), have high cross-sections for absorption and are commonly used in microwave-assisted synthesis to help heat non polar solvents.

In order to control the heating and cooling rates of the reaction system, additives can be intentionally introduced to the system as a constituent element. In general, there is no limitation to the nature of such additives, and can be either organic or inorganic materials. The additives can either be dispersed homogeneously or inhomogeneously in the reaction system. Moreover, the additives can be present in the reaction system from the beginning of the process or can be introduced during the course of the reaction. Examples of such additives are: graphite, silicon carbide, glycols, ionic liquids, tetrabutylammonium bromide, mono and dialkyl glycol ethers and cholesterols.

Furthermore, for synthesizing the same or different nanoparticles, in addition to the precursors that exist in the reaction system, one may further introduce the same or different precursors during the course of reaction.

4. The Main Constituent Elements of the Reaction System

As described above, the reaction system comprises one or more constituent elements. The main constituent element is the element with the largest molar equivalent. In the present invention, the dielectric constant of the main constituent element is 20 or less, preferably 18 or less, more preferably 16 or less, and most preferably 14 or less. If the dielectric constant is over 20, it may result in loss of stability of the precursors in the system due to the exceedingly high polarity of the main constituent element. Additives can be introduced into the system before or during the course of reaction as long as their amounts are less than the main constituent element in molar equivalent.

5. Nanoparticles

The nanoparticles synthesized by the method described in the present invention comprise mainly inorganic materials, and their diameters are on the order of nanometers (nm). The main crystal may be single crystal, polycrystal, alloys with or without phase separation due to stoichiometric variations, or core-shell structures that will be described later. The average diameter of such crystals are 0.5~100 nm, preferably 1~20 nm in order to warrant dispersibility, more preferably 2~12 nm, most preferably 2~10 nm. Such diameters can be determined through characterization by transmission electron microscopy (TEM). When the micrographs cannot be obtained with sufficient contrast to make such determination of the diameter, for instance when the constituent atoms are those of low atomic numbers, techniques such as matrix assisted laser desorption ionization spectroscopy, atomic force microscopy (AFM), or for colloidal solutions, dynamic light scattering or neutron scattering can often be used instead.

While there is no limitation in the size distribution of the above mentioned nanoparticles, in general, the standard deviation is ±20%, preferably ±15%, more preferably ±10%, and most preferably ±5%. When the size distribution exceeds the above, the nanoparticles will often not exhibit their desired physical and chemical properties to their best performance. Methods that are typically used to characterize the crystallinity of the nanoparticles are dark field transmission electron microscopy which is used to look for glide plane defects and/or twinning. Powder x-ray diffraction, which reveals the approximate diameters and shapes of the crystallites through peak intensities and scherrer broadening of the reflection peaks. Finally, z-contrast transmission electron microscopy is used to image the dopant ion in nanoparticle alloys.

6. The Composition of Semiconductor Nanoparticles

When the nanoparticles synthesized by the method described in the present invention are semiconductor, there is no limitation in their composition, but typical examples are single substances of Group 14 elements, such as C, Si, Ge, or Sn, single substances of Group 15 elements, such as P (black phosphorus), single substances of Group 16 elements, such as Se or Te, compounds of Group 14 elements, such as SiC, compounds of Group 14 and Group 16 elements, such as GeS, GeSe, GeTe, SnS, SnSe, SnTe, PbS, PbSe, or PbTe, and their ternary and quaternary alloys, such as $Ge_xSn_{1-x}S_ySe_{1-y}$ (x=0~1, y=0~1), compounds of Group 13 and Group 15 elements, such as AlN, AlP, AlAs, AlSb, GaN, GaP, GaAs, GaSb, InN, InP, InAs, or InSb, and their ternary and quaternary alloys, such as $Ga_xIn_{1-x}P_yAs_{1-y}$ (x=0~1, y=0~1), compounds of Group 13 and Group 16 elements or their alloys, such as GaS, GaSe, GaTe, InS, InSe, InTe, TlS, TlSe, TlTe, and their ternary and quaternary alloys, such as $Ga_xin_{1-x}S_ySe_{1-y}$ (x=0~1, y=0~1), compounds of Group 13 and Group 17 elements, such as TlCl, TlBr, TlI, compounds of Group 12 and Group 16 elements, such as ZnS, ZnSe, ZnTe, CdS, CdSe, CdTe, HgS, HgSe, HgTe, and their ternary and quaternary alloys, such as $Zn_xCd_{1-x}S_ySe_{1-y}$ (x=0~1, y=0~1), compounds of Group 15 and Group 16 elements, such as $As_2S_3$, $As_4S_4$, $As_2Se_3$, $As_2Te_3$, $Sb_2S_3$, $Sb_2Se_3$, $Sb_2Te_3$, $Bi_2S_3$, $Bi_2Se_3$, $Bi_2Te_3$, and their ternary and quaternary alloys, compounds of Group 11 and Group 16 elements, such as CuO, $Cu_2O$, $Ag_2S$ and CuSe, compounds of Group 11 and Group 17 elements, such as CuCl, AgBr and AuCl, ccompounds of Group 10 and Group 16 elements, such as $NiS_2$, PdS and PtSe, compounds of Group 9 and Group 16 elements, such as CoSe, RhS and IrSe, compounds of Group 8 and Group 16 elements, such as FeO, FeS, FeSe and RuS, compounds of Group 7 and Group 16 elements, such as MnO, MnS, MnSe and ReS, compounds of Group 6 and Group 16 elements, such as $Cr_2S_3$, $Cr_2Se_3$ and $MoS_2$, compounds of Group 5 and Group 16 elements, such as VS, VSe, and NbS, compounds of Group 4 and Group 16 elements, such as $TiO_2$, $TiS_2$, and $ZrS_2$, compounds of Group 2 and Group 16 elements, such as BeO, MgS, and CaSe, and chalcogen spinnels, barium titanates ($BaTiO_3$).

7. Core-Shell Structures

The crystals that form the main body of the nanoparticles of the present invention can be the so-called core-shell structure in which the crystals comprise inner-core and outer-shell for modification of their physical and chemical properties. Such shells are preferably metal, semiconductor, or insulator. As for semiconductor, examples of preferred materials are compounds of Group 13 and Group 15 elements, such as ME (where M=B, Al, Ga, In and E=N, P, As, Sb) and compounds of Group 12 and Group 16 elements, such as MA (where M=Zn, Cd, Hg and A=O, S, Se, Te) and compounds of Group 2 and Group 16 elements, such as TA (where T=Be, Mg, Ca Sr, Ba and A=O, S, Se, Te). Examples of more preferred materials for the shells are III-V compound semiconductors, such as BN, BAs, or GaN, II-VI compound semiconductors, such as ZnO, ZnS, ZnSe, CdS, compounds of Group 12 and Group 16 elements, such as MgS, or MgSe.

8. Doping of Nanoparticles

In the compositions described above in sections 5 and 6, minute amounts of additives can be intentionally doped for modification of the physical and chemical properties of the nanoparticles. Examples of such doping materials are Al, Mn, Cu, Zn, Ag, Cl, Ce, Eu, Tb, Er, or Tm.

9. Organic Compounds Present at the Nanoparticle Surface

The nanoparticles synthesized by the method described in the present invention can have organic compounds attached to their surface. The attachment of organic compounds to the surface is defined as the state in which the organic compound is chemically bonded to the surface. While there is no limitation in the form of bonding between the organic compound and the nanoparticle surface, examples are coordination bond, covalent bond, relatively strong bonds such as ionic bond, or through relatively weak interaction such as van der Waals force, hydrogen bond, hydrophobic-hydrophobic interaction, or entanglement of molecular chains. The organic compounds can be a single species or a mixture of two or more.

In general, in order to attach to the nanoparticle surface, organic compounds consist of the following coordinating functional groups that form bonds to the nanoparticle surface. Typically, coordinating functional groups that comprise Group 15 or Group 16 elements constitute the above mentioned organic compounds. Examples of such functional groups are, primary amines, secondary amines, tertiary amines, radicals containing nitrogen multiple bonds, such as nitryl, or isocyanate, nitrogen containing radicals such as nitric aromatics, such as pyridine or triazine, functional groups containing Group 15 element such as phosphorus containing radicals, such as primary phosphine, secondary phosphine, tertiary phosphine, primary phosphine oxide, secondary phosphine oxide, tertiary phosphine oxide, primary phosphine selenide, secondary phosphine selenide, tertiary phosphine selenide, or phosphonic acid, oxygen containing radicals, such as hydroxyl, ether, or carboxyl, sulfur containing radicals, such as thiol, methylsulfide, ethylsulfide, phenylsulfide, methyldisulphide, phenyldisulfide, thioacid, dithioacid, xanthogenic acid, xanthete, isothiocyanate, thiocarbamate, sulfonic, sulfoxide, or thiophene rings, functional groups containing Group 16 element such as selenium containing radicals, such as —SeH, —$SeCH_3$, —$SeC_6H_5$, or tellurium containing radicals, such as —TeH, —$TeCH_3$, —$TeC_6H_5$. Among these examples, functional groups containing nitrogen such as pyridine rings, functional groups containing Group 15 elements such as phosphorus, such as primary amine, tertiary phosphine, tertiary phosphine oxide, tertiary phosphine selenide, or phosphonic acid, functional groups containing oxygen, such as hydroxyl, ether, or carboxyl, or functional groups containing Group 16 elements such as sulfur, such as thiol or methylsulfide, are used preferably. More precisely, trialkylphosphines, trialkylphosphine oxides, alkane sulfonic acids, alkane phosphonic acids, alkyl amines, dialkylsulfoxides, dialkylether, and alkylcarboxyl acids are such examples.

While the detailed coordination chemistry of these organic compounds on the nanoparticle surface is not totally understood, in the present invention, as long as the nanoparticle surface is covered with these organic compounds, the functional groups may either retain their original structure or be modified.

10. The Amount of Organic Compounds at the Nanoparticle Surface

In the present invention, the amount of organic compounds present at the surface depends on the kind of nanoparticles and their surface area, such as their size, after proper separation, among the total weight of the nanoparticles and the organic compounds, is typically 1 to 90% of the weight, and for chemical stability and in order to disperse them into organic matrices such as solvents or resin binders that are practically important preferably 5~80%, more preferably, 10~70%, and most preferably 15~60%. The above mentioned organic composition can be determined, for example, by the various elemental analyses or thermogravimetric analysis (TGA). Furthermore, information regarding the chemical species and environment can be obtained by infrared (IR) spectroscopy or nuclear magnetic resonance (NMR).

11. Precursors

When the nanoparticles synthesize by the method described in the present invention are semiconductor, cationic materials that can be chosen from elements in Group 2~15 and anionic materials that can be chosen from elements in Group 15~17 can be used as precursors. When more than one material is used, they may be mixed prior to the synthetic reaction or may be separately introduced into the reaction system.

Examples of the precursors for semiconductors that contain cationic elements are, dialkylated compounds of Group 2 elements, such as diethyl magnesium, or di-n-butyl magnesium; alkyl halides of Group 2 elements, such as methyl magnesium chloride, methyl magnesium bromide, methyl magnesium iodide, ethynyl magnesium chloride; dihalides, such as magnesium iodide; halides of Group 4 elements, such as titanium (IV) tetrachloride, titanium (IV) tetrabromide, or titanium (IV) tetraiodide; halides of Group 5 elements, such as vanadium (II) dichloride, vanadium (IV) tetrachloride, vanadium (II) dibromide, vanadium (IV) tetrabromide, vanadium (II) diiodide, vanadium (IV) tetraiodide, tantalum (V) pentachloride, tantalum (V) pentabromide, and tantalum (V) pentaiodide; halides of Group 6 elements, such as chromium (III) tribromide, chromium (III) triiodide, molybdenum (IV) tetrachloride, molybdenum (IV) tetrabromide, molybdenum (IV) tetraiodide, tungsten (IV) tetrachloride, tungsten (IV) tetrabromide, and tungsten (IV) tetraiodide; halides of Group 7 elements, such as manganese (II) dichloride, manganese (II) dibromide, and manganese (III) diiodide; halides of Group 8 elements, such as iron (II) dichloride, iron (III) trichloride, iron (II) dibromide, iron (III) tribromide, iron (II) diiodide, and iron (II) triiodide; halides of Group 9 elements, such as cobalt (II) dichloride, cobalt (II) dibromide, and cobalt (II) diiodide; halides of Group 10 elements, such as nickel (II) dichloride, nickel (II) dibromide, and nickel (II) diiodide; halides of Group 11 elements, such as copper (I) iodide; dialkylated compounds of Group 12 elements, such as dimethyl zinc, diethyl zinc, di-n-propyl zinc, diisopropyl zinc, di-n-butyl zinc, diisobutyl zinc, di-n-hexyl zinc, dicyclohexyl zinc, dimethyl cadmium, diethyl cadmium, dimethyl mercury (II), diethyl mercury (II), and dibenzyl mercury (II); alkyl halides of Group 12 elements, such as methyl zinc chloride, methyl zinc chloride, methyl zinc iodide, ethyl zinc iodide, methyl cadmium chloride, and methyl mercury (II) chloride; dihalides of Group 12 elements, such as zinc chloride, zinc bromide, zinc iodide, cadmium chloride, cadmium bromide, cadmium iodide, mercury (II) chloride, zinc chloride iodide, cadmium chloride iodide, mercury (II) chloride iodide, zinc bromide iodide, cadmium bromide iodide, and mercury (II) bromide iodide; carboxylic acid salt of Group 12 elements, such as zinc acetate, cadmium acetate, and 2-ethyl hexanoic acid cadmium; oxides of Group 12 elements, such as cadmium oxide and zinc oxide; trialkylated compounds of Group 13 elements, such as trimethyl boron, tri-n-propyl boron, triisopropyl boron, trimethyl aluminum, trimethyl aluminum, triethyl aluminum, tri-n-butyl aluminum, tri-n-hexyl aluminum, trioctyl aluminum, tri-n-butyl gallium (III), trimethyl indium (III), triethyl indium (III), and tri-n-butyl indium (III); dialkyl monohalides of Group 13 elements, such as dimethyl aluminum chloride, diethyl aluminum chloride, di-n-butyl aluminum chloride, di-ethyl aluminum bromide, di-ethyl aluminum iodide, di-n-butyl gallium (III) chloride, or di-n-butyl indium (III) chloride; monoalkyl dihalides of Group 13 elements, such as methyl aluminum dichloride, ethyl aluminum dichloride, ethyl aluminum dibromide, ethyl aluminum diiodide, n-butyl aluminum dichloride, n-butyl gallium (III) dichloride, and n-butyl indium (III) dichloride; tri-halides of Group 13 elements, such as boron trichloride, boron tribromide, boron triiodide, aluminum trichloride, aluminum tribromide, aluminum triiodide, gallium (III) trichloride, gallium (III) tribromide, gallium (III) triiodide, indium (III) trichloride, indium (III) tribromide, indium (III) triiodide, gallium (III) dichloride bromide, gallium (III) dichloride iodide, gallium (III) chloride diiodide, and indium (III) dichloride iodide; carboxylic acid salt of Group 13 elements, such as indium (III) acetate and gallium (III) acetate; halides of Group 14 elements, such as germanium (IV) tetrachloride, germanium (IV) tetrabromide, germanium (IV) tetraiodide, tin (II) dichloride, tin (IV) tetrachloride, tin (II) dibromide, tin (IV) tetrabromide, tin (II) diiodide, tin (IV) tetraiodide, tin (IV) dichloride diiodide, tin (IV) tetraiodide, lead (II) dichloride, lead (II) dibromide, and lead (II) diiodide; hydrates of Group 14 elements, such as diphenyl silane; trialkyls of Group 15 elements, such as trimethyl antimony (III), triethyl antimony (III), tri-n-butyl antimony (III), trimethyl bismuth (III), triethyl bismuth (III), and tri-n-butyl bismuth (III); monoalkyl halides of Group 15 elements, such as methyl antimony (III) dichloride, methyl antimony (III) dibromide, methyl antimony (III) diiodide, ethyl antimony (III) diiodide, methyl bismuth (III) dichloride, and ethyl bismuth (III) diiodide; trihalides of Group 15 elements, such as arsenic (III) trichloride, arsenic (III) tribromide, arsenic (III) triiodide, antimony (III) trichloride, antimony (III) tribromide, antimony (III) triiodide, bismuth (III) trichloride, bismuth (III) tribromide, and bismuth (III) triiodide; etc.

For synthesis of nanoparticles of Group 14 elemental semiconductors such as Si, Ge, or Sn, halides of Group 14 elements, such as germanium (IV) tetrachloride, germanium (IV) tetrabromide, germanium (IV) tetraiodide, tin (II) dichloride, tin (IV) tetrachloride, tin (II) dibromide, tin (IV) tetrabromide, tin (II) diiodide, tin (IV) diiodide, tin (IV) dichloride diiodide, tin (IV) tetraiodide, lead (II) dichloride, lead (II) dibromide, and lead (II) diiodide; or hydrides and/or alkylated compounds of Group 14 elements, such as diphenyl silane, can be used as precursors.

Examples of anionic compounds that can be used as precursors for semiconductors are, elements of Groups 15~17, such as N, P, As, Sb, Bi, O, S, Se, Te, F, Cl, Br, and I; hydrides of Group 15 elements, such as ammonia, phosphine ($PH_3$), arsine ($AsH_3$), and stibine ($SbH_3$); silylated compounds of elements of Group 15 of the periodic table, such as tris(trimethylsilyl) amine, tris(trimethylsilyl) phosphine, and tris(trimethylsilyl) arsine; hydrides of Group 16 elements, such as hydrogen sulfide, hydrogen selenide, and hydrogen telluride; silylated compounds of Group 16 elements, such as bis(trimethylsilyl) sulfide and bis(trimethylsilyl) selenide, alkaline metal salts of Group 16 elements, such as sodium sulfide and sodium selenide; trialkylphosphine chalcogenides, such as tributylphosphine sulfide, trihexylphosphine sulfide, trioctylphosphine sulfide, tributylphosine selenide, trihexylphosphine selenide, and trioctylphosphine selenide, hydrides of Group 17 elements, such as hydrogen fluoride, hydrogen chloride, hydrogen bromide, and hydrogen iodide; and silylated compounds of Group 17 elements, such as trimethylsilyl chloride, trimethylsilyl bromide, and trimethylsilyl iodide; etc. Among these, from the stand points of reactivity, stability, and handling, the preferred materials are, elemental materials in Groups 15~17, such as phosphorus, arsenic, antimony, bismuth, sulfur, selenium, tellurium, and iodine; silylated compounds of Group 15 elements, such as tris(trimethylsilyl) phospine and tri(trimethylsilyl) arsine; hydrides of Group 16 elements, such as hydrogen sulfide, hydrogen selenide and hydrogen telluride; silylated compounds of Group 16 elements, such as bis(trimethylsilyl) sulfide and bis(trimethylsilyl) selenide; alkaline metal salts of Group 16 elements, such as sodium sulfide and sodium selenide; trialkylphosphine chalcogenides such as, tributylphosphine sulfide, trihexylphosphine sulfide, trioctylphosphine sulfide, tributylphosphine selenide, trihexylphosphine selenide, and trioctylphosphine selenide; silylated compounds of Group 17 elements, such as trimethylsilyl chloride, trimethylsilyl bromide, and trimethysilyl iodide; etc. Among the above, more preferably used materials are, elemental materials in Groups 15 and 16, such as phosphorus, arsenic, antimony, sulfinur, and selenium; silylated compounds of Group 15 elements, such as tris(trimethylsilyl) phospine and tri(trimethylsilyl) arsine; silylated compounds of Group 16 elements, such as bis(trimethylsilyl) sulfide and bis(trimethylsilyl) selenide; alkaline metal salts of Group 16 elements, such as sodium sulfide and sodium selenide; trialkylphosphine chalcogenides such as, tributylphosphine sulfide, trioctylphosphine sulfide, tributylphosphine selenide, and trioctylphosphine selenide; etc.

Examples of precursors for metal nanoparticles for group 4 through 13 including Au, Ag, Fe, Ni, Co, Pt, Pd, Cu, Hg, In, NiPt, FePt, FeCo are: Gold: auric acid, chlorocarbonyl gold (I, and gold (I) chloride; Silver: silver (I) acetate, silver (I) nitrate, silver (I) chloride, silver (I) bromide, silver (I) iodide, and silver sulfate; Iron (either as II or III oxidation state): iron chloride, iron bromide, iron iodide, iron (O) carbonyl, iron acetate, iron acetyl acetonate, iron hexapyridine, iron hexamine, iron sterate, iron palmitate, iron sulfonate, iron nitrate, iron dithiocarbamate, iron dodecylsulfate, and iron tetrafluroborate; Nickel: nickel (II) nitrate, nickel (II) chloride, nickel (II) bromide, nickel (II) iodide, nickel (II) carbonyl, nickel (II) acetate, nickel (II) acetyl acetonate, nickel (II) hexapyridine, nickel (II) hexamine, nickel (II) sterate, nickel (II) palmitate, nickel (II) sulfonate, nickel (II) nitrate, nickel (II) dithiocarbamate, nickel (II) dodecylsulfate, and nickel (II) tetrafluroborate; Cobalt: cobalt (II) nitrate, cobalt (II) chloride, cobalt (II) bromide, cobalt (II) iodide, cobalt (II) carbonyl, cobalt (II) acetate, cobalt (II) acetyl acetonate, cobalt (II) acetyl acetonate cobalt (II) hexapyridine, cobalt (II) hexamine, cobalt (II) sterate, cobalt (III) palmitate, cobalt (II) sulfonate, cobalt (II) nitrate, cobalt (II) dithiocarbamate, cobalt (II) dodecylsulfate, and cobalt (II) tetrafluroborate; Platinum: platinum (II) nitrate, platinum (II) chloride, platinum (II) bromide, platinum (II) iodide, platinum carbonyl, platinum (II) acetate, platinum (II) acetyl acetonate, platinum (II) hexapyridine, platinum (II) hexamine, platinum (II) sterate, platinum (II) palmitate, platinum (II) sulfonate, platinum (II) nitrate, platinum (II) dithiocarbamate, platinum (II) dodecylsulfate, and platinum (II) tetrafluroborate; Palladium: palladium (II) nitrate, palladium (II) chloride, palladium (II) bromide, palladium (II) iodide, palladium carbonyl, palladium (II) acetate, palladium (II) acetyl acetonate, palladium (II) hexapyridine, palladium (II) hexamine, palladium (II) sterate, palladium (II) palmitate, palladium (II) sulfonate, palladium (II) nitrate, palladium (II) dithiocarbamate, palladium (II) dodecylsulfate, and palladium (II) tetrafluroborate; Copper (I or II oxidation state): copper nitrate, copper chloride, copper bromide, copper iodide, copper carbonyl, copper acetate, copper acetyl acetonate, copper hexapyridine, copper hexamine, copper sterate, copper palmitate, copper sulfonate, copper nitrate, copper dithiocarbamate, copper dodecylsulfate, and copper tetrafluroborate; Mercury:, dimethyl mercury (0), diphenyl mercury (0), mercury (II) acetate, mercury (II) bromide, mercury (II) chloride, mercury (II) iodide, and mercury (II) nitrate; Indium: trimethyl indium (III), indium (III) dichloride, indium (III) trichloride, indium (III) tribromide, and indium (III) triiodide.

12. Solvents

The solvent effect for nanoparticle formation under dielectric heating is twofold: (1) it provides the matrix for which the reactants form products; and (2) they have the ability to absorb microwaves to intrinsically heat the reaction matrix. The matrix effect can be noncoordinating or coordinating in nature. Noncoordinating implies that the solvent does not form bonds to the precursor molecules or intermediate complexes during nanoparticle formation (it usually does not have functional groups). Coordinating implies the solvent forms bonds to the precursor molecules and intermediates during nanoparticle formation.

Noncoordinating solvents used for nanoparticle formation usually consist of long chain, high boiling alkanes and alkenes such as hexadecane, octadecane, eicosane, 1-hexadecene, 1-octadecene and 1-eicosene. Typical coordinating solvents consist of long chain (backbone of 6 to 20 carbons) alkyl amines (primary, secondary and tertiary), carboxylic acids, sulfonic acids phosphonic acids, phosphines and phosphine oxides.

The ability for a solvent to absorb microwaves is highly dependant on its dipole moment. The dipole moment is defined as the product of the distance between two charges and the magnitude of the charge; hence, when a coordinating solvent is used as the solvent, it has a higher propencity of heating the bulk solution faster than a noncoordinating solvent that has a lower dipole moment by definition. When comparing the heating rates of trioctylphosphineoxide (760° C./min) to 1-aminohexadecane (30° C./min), trioctylphosphineoxide converts electric energy to heat more efficiently. Comparing these to the heating rate of tetradecene (12° C./min) shows that the choice of solvents has a substantial influence on the rate at which the heat is transferred to the bulk solution.

One way to slow down the rate of heating for a solvent that absorbs microwave strongly, like trioctylphosphineoxide, is to reduce the incident microwave power. This will allow the ramp rate to be tailored to suit a particular nanoparticle formation.

Technical grade solvent dielectric heating rates for nanoparticle synthesis will depend on several factors: the dielectric constant, the volume of solvent, and its boiling point. For nonpolar solvents such as $C_6$-$C_{20}$ straight chain alkanes, the heating rates are slow for 5 ml of solvent at 300 W of incident power.

For example, super-heated noncoordinating technical grade octane plateaus at 147° C. after 15 minutes of heating at 300 W with 10 atm of pressure. However, in the presence of Cd and Se monomers (57 mM), super-heating octane can reach nanoparicle formation temperatures as high as 250° C. in 6 minutes with 15 atm of pressure with 300 W of incident microwave power.

The lower boiling point alkanes will have a lower plateau temperature in terms of the maximum sustained temperature at high pressure. The higher boiling alkanes can achieve higher temperatures in a shorter period of time when compared to alkanes. When 5 ml of technical grade tetradecene is dielectrically heated at 300 W, it can reach 250° C. in 13 min.

Coordinating solvents typically heat faster at lower pressure due to their higher boiling points and functional groups. For example, 5 ml of technical grade hexadecylamine can be dielectrically heated at 300 W to 280° C. in 11 minutes with 1 atm of pressure. In the same manner, trioctylphosphine oxide can be dielectrically heated to 280° C. in 15 seconds with 1 atm of pressure.

13. Ionic Liquids

Ionic liquids (ILs) translate very well to microwave-assisted formation of nanoparticles. The effect of the ionic liquid to rapidly heat the bulk solution can be traced back to their selective ability to couple with the microwaves and efficiently convert electromagnetic energy into heat. The effect of the higher heating rate in the presence of the ionic liquids increases the microscopic reaction temperatures at the forming nanoparticles. Whereas microwave power can overcome kinetic barriers, the addition of ionic liquids overcomes thermodynamic barriers in the reaction. This is seen in FIG. 1 to be critical for overcoming activation barriers during the growth phase for the II-VI materials. In addition, ILs can be used as unique passivants for nanoparticles. Appropriate selection can be utilized for all nanomateial compositions described herein.

The organic synthetic literature has shown that the use of ionic liquids can be used to aid heating of non-polar solvents such as hexanes, toluene and benzene. The high dielectric heating ability of ionic liquids at low concentrations compared to the solvent increases the microscopic temperature of the solution. It can therefore be imagined that by choosing a cation/anion pair that will not coordinate to the nanoparticles intermediates or the surface of growing nanoparticles, can aid as spectating microscopic heat sources. It is demonstrated that the use of a simple ionic liquid, 1-hexyl-3-methylimidazolium chloride enhances the heating rate of CdSe precursors in hexadacylamine and the rate of formation of the nanoparticles.

Dielectric heating of nonpolar molecules is not only common to inorganic materials synthesis, but it is a common theme in organic synthetic chemistry. Heating large volumes of benzene, toluene or hexane for industrialization of pharmaceuticals has generated research for heating non-polar matrices. The ability of ionic liquids to convert electromagnetic energy to heat has led to growing research on the discovery of new ionic liquids and their structure in solution.

A series of available ILs can be found in existing compendiums of organic compounds. In general ionic liquids composed of the cation families: imidazolium, phosphonium, pyridinium, ammonium, sulfonium, piciolinium, thiazolium, oxazolium, pyrazolium, selenolium, teluronium, and their family of substituted species are utilized to control the reaction. The choice of the IL is dependent on the desire to apply microscopic reaction control at the nanoparticle surface (passivation) or at the constituent and/or growing nanoparticle reactivity's (microscopic heating). Lewis acidity and bascity which are involved in constituent reactivity and surface passivation of a growing nanoparticle is tunable by counterion selction. A strong Lewis base increases passivant-like behavior, while a sterically hindered, i.e., tetra-alkyl ammonium salt, increases microscopic temperatures. The choice of the counterion can be as simple as a halide or slightly more sophisticated like long chain derivatized sulfates or phosphates. In this experiment, the use of a simple ionic liquid 1-hexyl-3-methylmidazolium chloride is shown to greatly enhance the heating rate of hexadecylamine and the formation rate of CdSe nanoparticles. It does not work for the III-V class, namely InP.

The heating rate for pure alkyl amine solvents like 1-aminooctane, 1-aminododecane, and 1-aminohexadecane are comparable to non-polar alkanes due to the similar dielectric constants. Upon addition of the ionic liquid 1-hexyl-3-methylimidazolium chloride, the heating rate of the solution increases dramatically due to the large microwave cross section for ionic liquids. The effect of the ionic liquid to rapidly heat the bulk solution can be traced back to their selective ability to couple with the microwaves and efficiently convert electromagnetic energy into heat. The effect of the higher heating rate in the presence of the ionic liquids will increase the microscopic reaction temperatures at the forming nanoparticles is critical for overcoming activation barriers during the growth phase for the II-VI materials.

14. EXAMPLES

As provided hereunder, embodiments of the present invention will be illustrated in more detail by ways of examples, although the present invention is not limited to these examples provided that the outcome is within the gist of the present invention.

With regard to the material reagents, commercially available reagents were used without purification unless otherwise stated.

Instrument Setup, Conditions, etc., for Measurement
(1) Microwave assisted synthesis setup:
a. DISCOVER system, CEM Corporation, NC, U.S.A.
b. MILESTONE ETHOS system (continuous and pulsed power supply), Milestone Corporation, Monroe, Conn., U.S.A.
(2) UV/V is absorption spectroscopy: CARY 50BIO WIN UV Spectrometer.
(3) Photoluminescence spectroscopy: CARY ECLIPSE Fluorescence Spectrometer.
(4) X-ray diffractometry: SCINTAG X2 powder diffractometer.
(5) Transmission electron microscopy: JEOL 2010 Transmission Electron Microscope General Procedure The duration of nanoparticle reactions have been optimized to 15 minutes at a maximum temperature of 280° C. It is shown that under the influence of microwave radiation, the crystallinity becomes dependant on the power of the radiation in concert with the temperature of the reaction. The microwave reactor allows the precursors to be prepared at or near room temperature (RT) and loaded into a reaction vessel prior to its introduction into an RT chamber of the microwave reactor. The reaction vessel is then heated to temperatures between 200° C. and 300° C. with active cooling. The microwave reactor operates at 2.45 GHz and can be adapted to a continuous flow or autosampler system. Incorporation of integrated absorption and fluorescent detectors allow the reaction stream to be continuously monitored for applications where high throughput, high volume preparation of colloidal semiconductor nanoparticles is desired.

In a typical small scale synthesis (5 ml or less), the reactants are mixed in a high-pressure reaction vessel and placed in the RT chamber of the microwave reactor. The reaction is controlled by a predetermined program that controls and monitors reaction time, temperature, pressure, and microwave power (wattage) in real time. These reaction parameters control material size, purity, crystallinity, and dispersity. The synthetic protocol allows reproducible production of materials. The isolation and storage of the materials can be done directly inside the high-pressure reaction vessel, thereby eliminating the step of material transfer that potentially exposes the materials to contaminants such as oxygen and water. The Teflon liner in the chamber of the microwave reactor was re-designed from typical commercial specifications in order to tolerate high temperatures for extended periods of time. The reaction vessel comprises a 5 ml vial with a high-pressure aluminum crimp top with Teflon septa. All glassware was dried prior to use. All reagents were manipulated by standard airless techniques.

In a typical large scale reaction (5 ml or greater), the reactants are placed in a standard round bottom flask (Kirmax, Pyrex or Chemglass) and placed in a RT chamber and irradiated with continuous or pulsed power with dual magnetrons until the desired temperature is reached.

Example 1

Preparation of CdSe from a Single Source Precursor $Li_4[Cd_{10}Se_4(SPh)_{16}]$ It has been shown by Cumberland et al. in [7] that a novel single source precursor based upon $Li_4[Cd_{10}Se_4(SPh)_{16}]$ in the presence of mild coordinating alkyl amine solvent can yield CdSe quantum dots in the size range of 2-9 nm with a reaction time of 720 minutes on average. Using this single source precursor in the presence of hexadecylamine (HDA) microwave irradiation yields nanoparticles in a fraction of the time.

Figure 2:
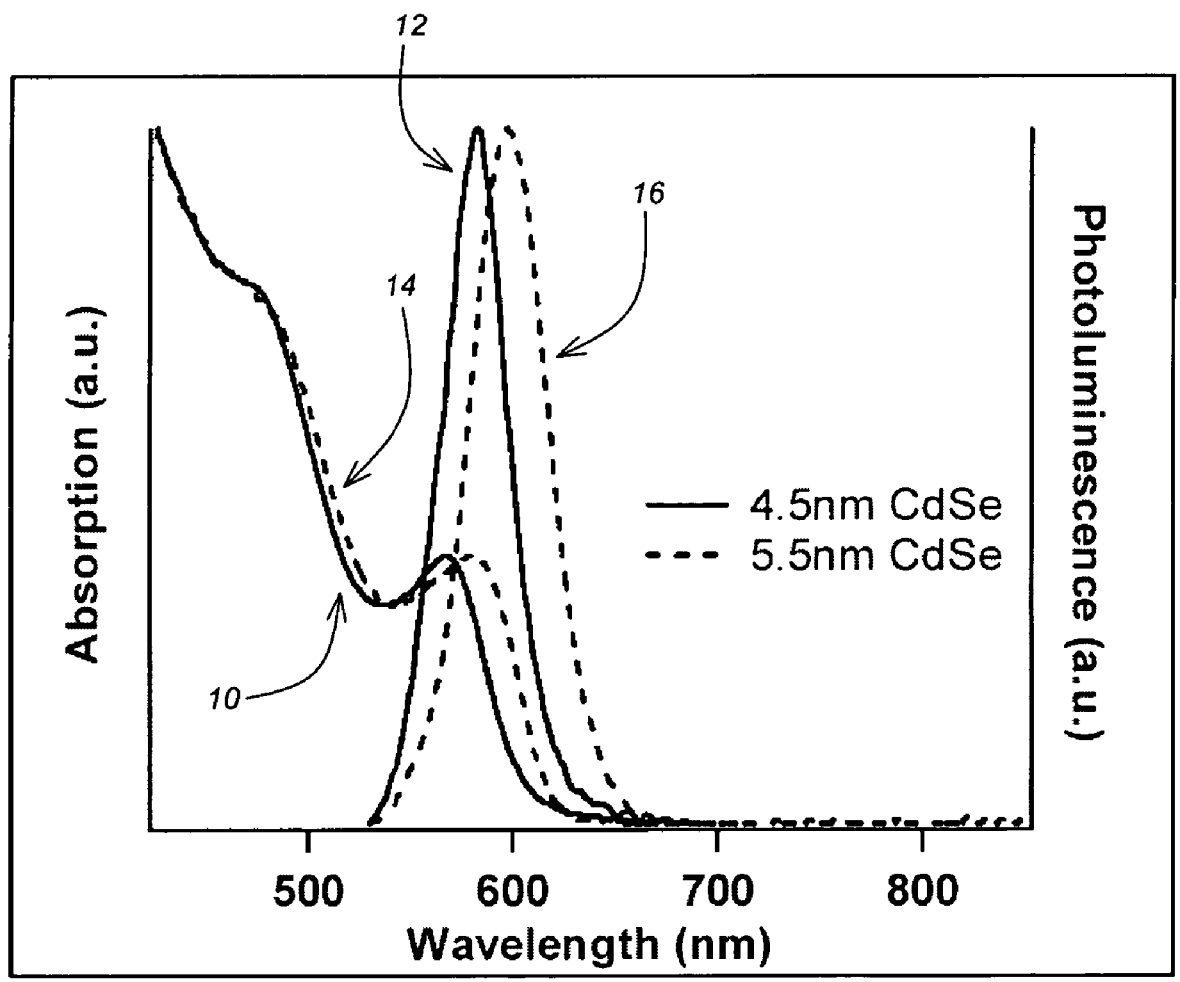
FIG. 2 is a graph that illustrates the absorption and photoluminescence for 4.5 nm and 5.5 nm CdSe.

50 g of HDA was degassed under vacuum at 110° C. 80 mg of $Li_4[Cd_{10}Se_4(SPh)_{16}]$ was placed in the reaction vessel and sealed with a high pressure crimp cap followed by the addition of 4 ml of molten, degassed HDA (at approximately 70° C.). The reaction vessel was placed in the chamber of the microwave reactor and irradiated with 300 Watts of power until it reached 230° C., at which time the power was decreased to 230 Watts. This power and temperature was held constant for 60 minutes. At 60 minutes, the power was turned off and the latent heat of the reaction vessel was quickly removed by passing compressed air across it. This produced monodisperse 4.5 nm to 5.5 nm CdSe nanoparticles. Smaller sizes can be isolated under these experimental parameters simply by quenching the reaction at shorter time intervals. Increasing the microwave power to 250 Watts for 60 minutes at 230° C. can yield sizes larger than 4.5 nm, e.g., 5.5 nm, as shown in FIG. 2, wherein traces 10 and 12 represent the absorption and photoluminescence, respectively, of 4.5 nm CdSe synthesized at 230° C. and 230W, while traces 14 and 16 represent the absorption and photoluminescence, respectively, of 5.5 nm CdSe grown at 230° C. and 250W.

High heating rate: 30° C./min

Main constituent of the reactant (Dielectric constant): Hexadecylamine (2.71) [5]

Example 2

Preparation of CdSe from a Single Source Precursor $Li_4[Cd_{10}Se_4(SPh)_{16}]$ and 1-hexyl-3-methylimidazolium Chloride The CdSe was prepared using the single source precursor $Li_4[Cd_{10}Se_4(SPh)_{16}]^2$. A stock solution of the precursor cluster was prepared by adding 635 mg of $Li_4[Cd_{10}Se_4(SPh)_{16}]$ and 0.0448 g of 1-hexyl-3-methylimidazolium chloride to 45 g of degassed 1-aminohexadecane at 90° C. The solution was degassed under Ar, and 5 ml aliquots were injected into the microwave reaction vials prior to the reaction. A series of reaction were performed in which the applied power was increased from 160 to 400 W keeping the reaction time at 3 minutes and the temperature fixed at 210° C. by active cooling.

An important characteristic of dielectric heating is that microscopic instantaneous temperatures can be reached with small amounts of ionic liquid. It is clear from FIG. 1 that the onset of the first exciton redshifts with increasing power. That is, the CdSe nanoparticles in the microwave can be forced to grow by increasing the microscopic temperature of the reaction. This is achieved by the addition of the ionic liquid to the reaction mixture. When the IL is present in the solution in a 1.1 mol ratio of IL to the inorganic cluster the heating rate increases from 3° C./s to 12° C./s.

Example 3

Preparation of CdSe from CdNO3 and TOP: Se.

Figure 3:
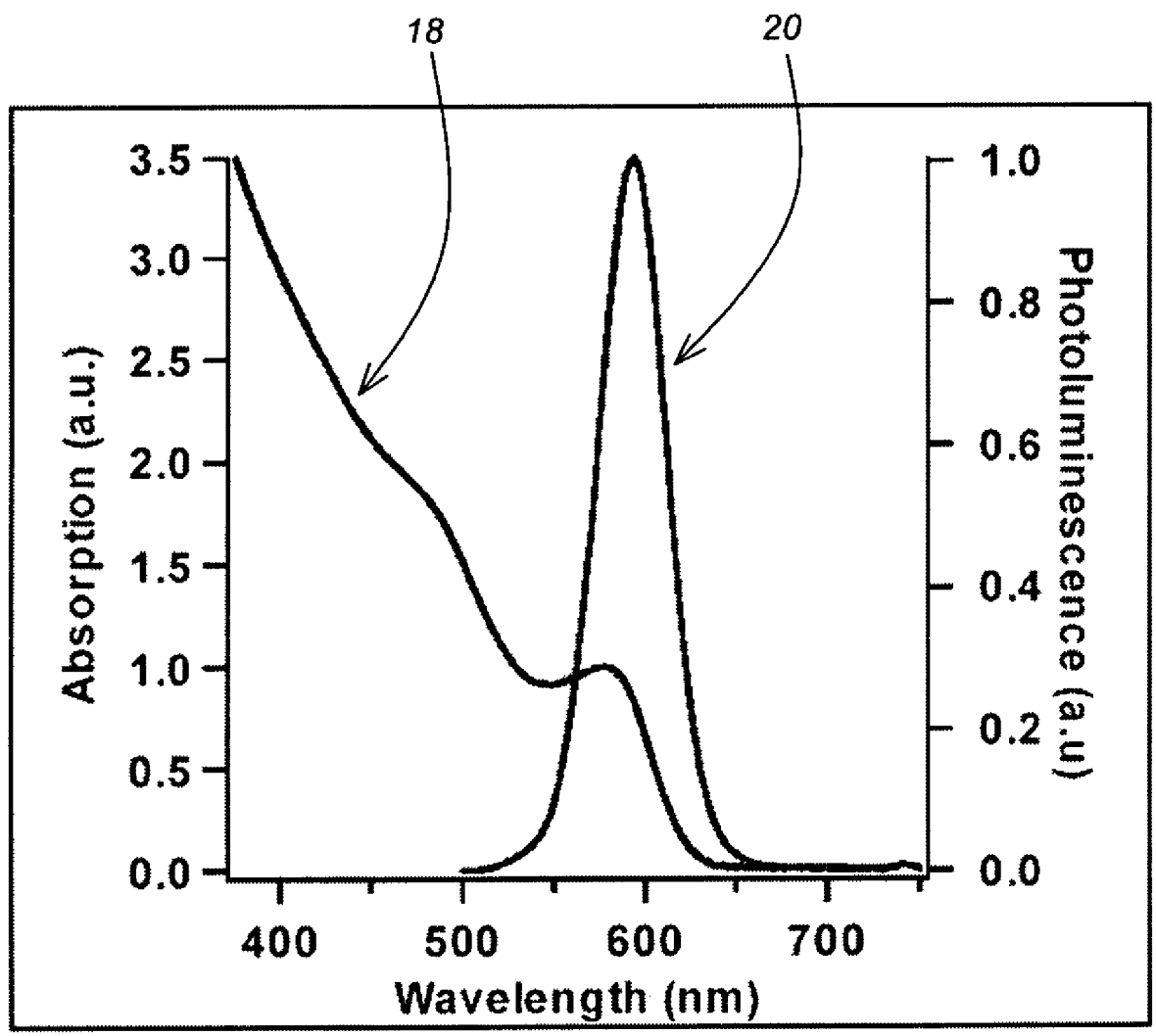
FIG. 3 is a graph that illustrates the absorption and photoluminescence for 4.6 nm CdSe.

Stock solutions of Cd and Se were prepared separately. The cation solution was prepared by dissolving 435 mg of cadmium nitrate tetrahydrate in 9.6 ml of trioctylphosphine (TOP). This solution was heated to 100° C. under vacuum for 30 minutes. The reaction mixture was purged with Ar three times and then cooled to room temperature for later use. The anion solution was prepared by mixing 182 mg of 200 mesh Se powder in 2.8 ml TOP The coordinating solvent, trioctyphosphine oxide (TOPO), was degassed under vacuum at 110° C. three times and back filled with Ar over a two hour period. The Cd (0.5 ml) and Se (0.6 ml) were mixed in a teflon sealed reaction vial, and diluted with 3.9 ml molten TOPO (approximately 65° C.) to make a 5 ml solution. The reaction vessel was placed in the chamber of the microwave reactor at room temperature. 300 Watts were applied for several seconds, at which time the temperature spiked from 40° C. to 230° C. in 15 seconds. The power was reduced to 40 Watts to stabilize the temperature at 250° C. for 8 minutes. At 8 minutes, the power was turned off and the reaction was quenched. This resulted in a 4.6 nm CdSe nanoparticle, approximated by the excitonic peak position, as shown in FIG. 3, wherein traces 18 and 20 represent the absorption and photoluminescence, respectively, of CdSe grown from cadmium nitrate and trioctylphosphineselenide. Note that nanoparticle diameter can be tuned by reaction temperature.

High heating rate: 760° C./min
Main constituent of the reactant (Dielectric constant): TOPO (<20)
Ref: Dielectric constants of materials similar to TOPO [24, 25]

|  |  | Temp.(° C.) | Dielectric Const. |
|---|---|---|---|
| Triethylphosphine oxide | $(C_2H_5)_3P=O$ | 323.2 | 35.5 |
| Tributylphosphine oxide | $(C_4H_9)_3P=O$ | 323.2 | 26.4 |
| Triheptylphosphine oxide | $(C_7H_{15})_3P=O$ | 323.2 | 30.4 |
| Trioctylphosphine oxide | $(C_8H_{17})_3P=O$ | <TOPO> | ~19 |
| Trinonylphosphine oxide | $(C_9H_{19})_3P=O$ | 323.2 | 15.4 |

Example 4

Preparation of InP from In(OAc) and $P(SiMe_3)_3$

The preparation of the stock precursor solutions was done according to literature methods, such as those in [9]. A solution of indium acetate and hexadecanoic acid was prepared in hexadecene. The mole ratio of In to hexadecanoic acid was adjusted to a 1 to 3. The salts were dissolved at 100° C. to make a 15.6 mM solution in In. The solution was degassed at this temperature for 1 hour and purged with Ar three times. A stock solution of tris(trimethylsilyl) phosphine at 86.1 mM was prepared in dry hexadecene.

The In and P precursors were mixed at 50° C. in a 10 ml sealed reaction vessel in a 2:1 ratio to make a total volume of 5 ml precursor solution. The reaction vessel was irradiated with 300 watts of power until the solution reached a temperature of 280° C. The power was reduced to maintain 280 watts. This temperature and power was maintained for 15 minutes, at which time the reaction was rapidly quenched.

High heating rate: 30° C./min
Main constituent of the reactant (Dielectric constant):
Hexadecene (2.1~2.2)
(Ref: Dielectric constant of 1-tridecene is 2.139)
Ref: Dielectric constants of materials similar to hexadecane [24]

|  |  | Temp.(° C.) | Dielectric Const. |
|---|---|---|---|
| 1-Hexene | $C_6H_{12}$ | 294.0 | 2.007 |
| 1-Heptene | $C_7H_{14}$ | 293.2 | 2.092 |
| 1-Octene | $C_8H_{16}$ | 293.2 | 2.113 |
| 1-Nonene | $C_9H_{18}$ | 293.2 | 2.180 |
| 1-Decene | $C_{10}H_{20}$ | 293.2 | 2.136 |
| 1-Undecene | $C_{11}H_{22}$ | 293.2 | 2.137 |
| 1-Dodecene | $C_{12}H_{24}$ | 293.2 | 2.152 |
| 1-Tridecene | $C_{13}H_{26}$ | 293.2 | 2.139 |

Example 5

Preparation of InGaP from In(OAc), Ga (acac), and $P(SiMe_3)_3$

The stock solution was prepared by a modification of literature methods [9]. Indium III acetate (0.700 mmol), gallium III 2,4-pentanedionate (0.070 mmol) and hexadecanoic acid (2.30 mmol) were mixed with 50 ml either octadecene or hexadecene. The mixture was heated to 160° C. until the solution turned clear. The temperature of the stock solution was reduced to 110° C. under vacuum and purged with Ar three times.

For 4.8 nm quantum dots, the cation stock solution was prepared with octadecene and mixed with tris(trimethylsilyl) phosphine in the reaction vessel via syringe at 50° C. with a cation:anion mole ratio of 2:1. 5 ml of the stock solution was placed in a 10 ml sealed reactor vial (CEM). The 2.3 nm quantum dots were prepared in the same fashion, but the stock solution was prepared in hexadecene.

Reactor temperature and pressures were monitored continuously to ensure safety, with pressures not exceeding 1.7 atm during the course of the reaction. The power level of the ramp was 300 watts. The hold temperature was 280° C. for 15 min., with a constant power level of 280 watts during the reaction. To ensure controlled dispersity, the reaction vessel was rapidly cooled, via a quenching Oswald Ripening process, from 280° C. to 95° C. over a period of 2 min using compressed air. Depending on the concentration of precursors, the ramp rate to achieve the hold temperature ranged from 4-6 minutes with the more dilute samples taking longer, due to the heating arising from direct dielectric heating of the precursors, rather then the thermal heating of the solvent. Size control for these materials was achieved by controlling the concentration of the constituent elements in the reactant.

High heating rate: 32° C./min
Main constituent of the reactant: octadecene (Dielectric constant estimated to be 2.1~2.2)

When hexadecene was used as the non-coordinating solvent, approximately 2.3 nm InGaP was grown. When octadecene was used as the non-coordinating solvent, 4.8 nm nanoparticles were grown. The size is determined by Scherrer broadening of the powder x-ray diffraction peaks, as shown in FIGS. 4A and 4B.

Figures 4A, 4B:
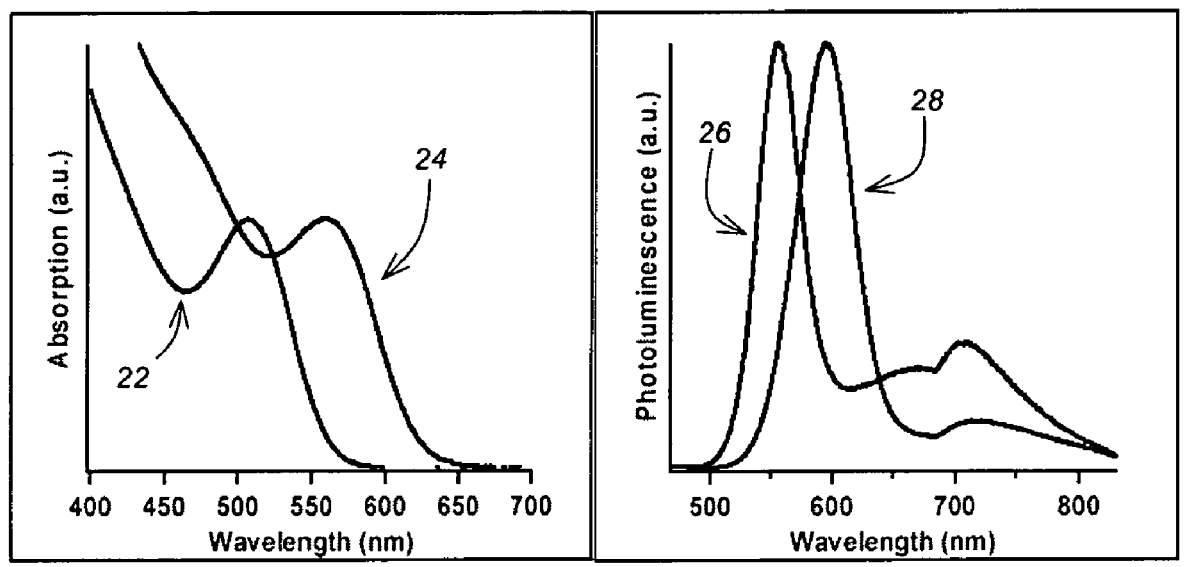
FIGS. 4A and 4B are graphs that illustrate the absorption and photoluminescence of InGaP nanocrystals synthesized with hexadecene (HDE) and octadecene as the non-coordinating solvents.

FIG. 4A illustrates the absorption and FIG. 4B illustrates the photoluminescence of InGaP nanoparticles synthesized at 280° C. for 15 minutes at 280 Watts. Traces 22 and 26 represent InGaP synthesized with hexadecene (HDE) as the non-coordinating solvent, and traces 24 and 28 represent InGaP synthesized with octadecene as the non-coordinating solvent.

An important feature of the specific microwave effect on III-V ternary compound crystal growth is that the crystallinity (optical properties of the final product) is dependant on the microwave power. If the reaction time and temperature are held constant while the power is reduced, low energy defect emission begins to form, as shown in FIG. 5.

Figure 5:
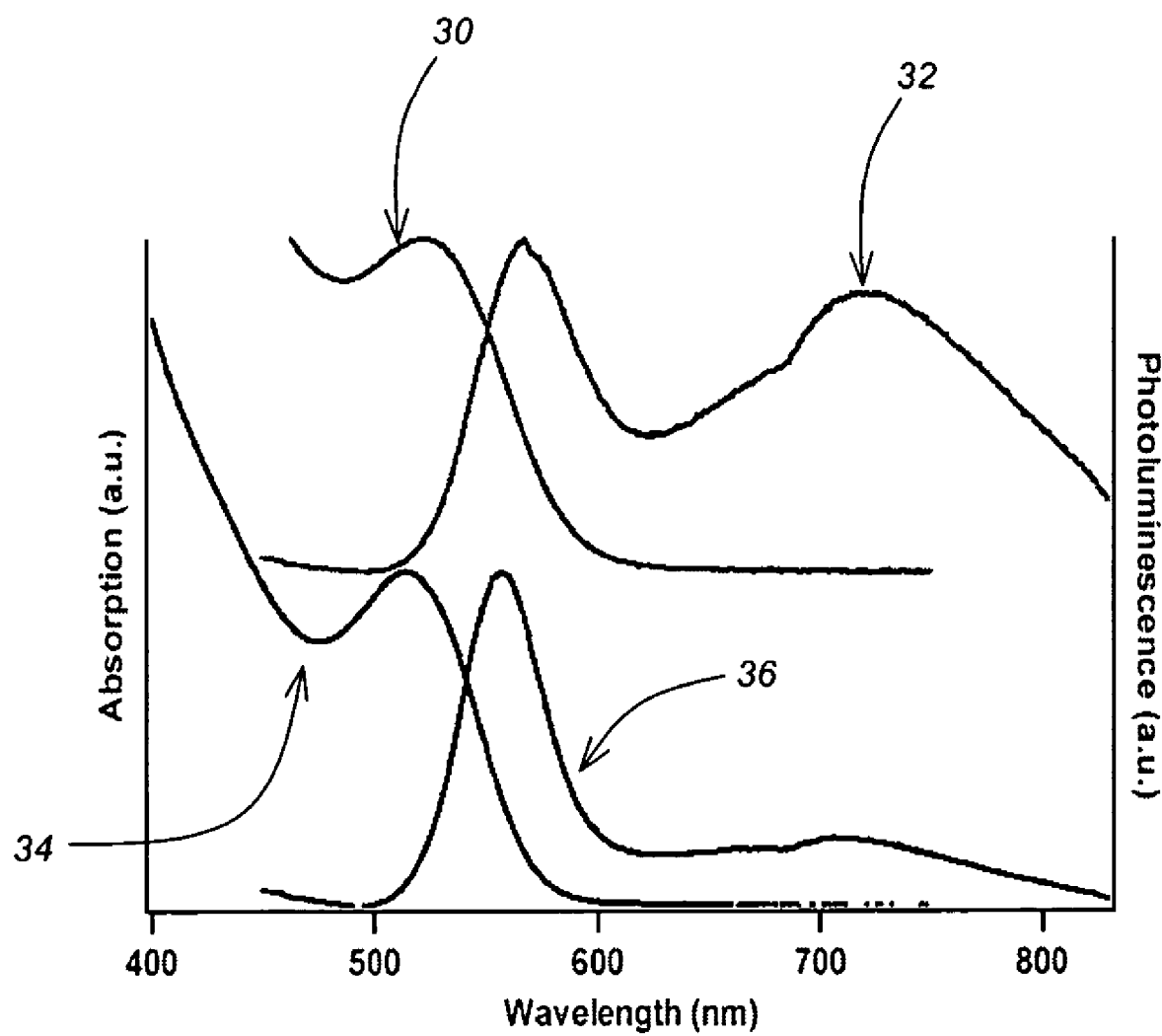
FIG. 5 is a graph that illustrates the absorption and photoluminescence of InGaP showing the dependence of crystallinity on power.

FIG. 5 illustrates the absorption and photoluminescence of InGaP showing the dependence of crystallinity on power, wherein trace 30 represents the absorption for InGaP and trace 32 represents the photoluminescence for InGaP that were synthesized with a constant power of 230 watts, while trace 34 represents the absorption for InGaP and trace 36 represents the photoluminescence for InGaP that were synthesized at a constant power of 270 watts.

The defect emission can be attributed to surface vacancies or glide plane defects. It is clear that not only high temperature is important for high quality material, but high power is needed as well. The structural characterization of the material exhibits the zinc blende structure of bulk InP.

15. Processing Steps

Figure 6:
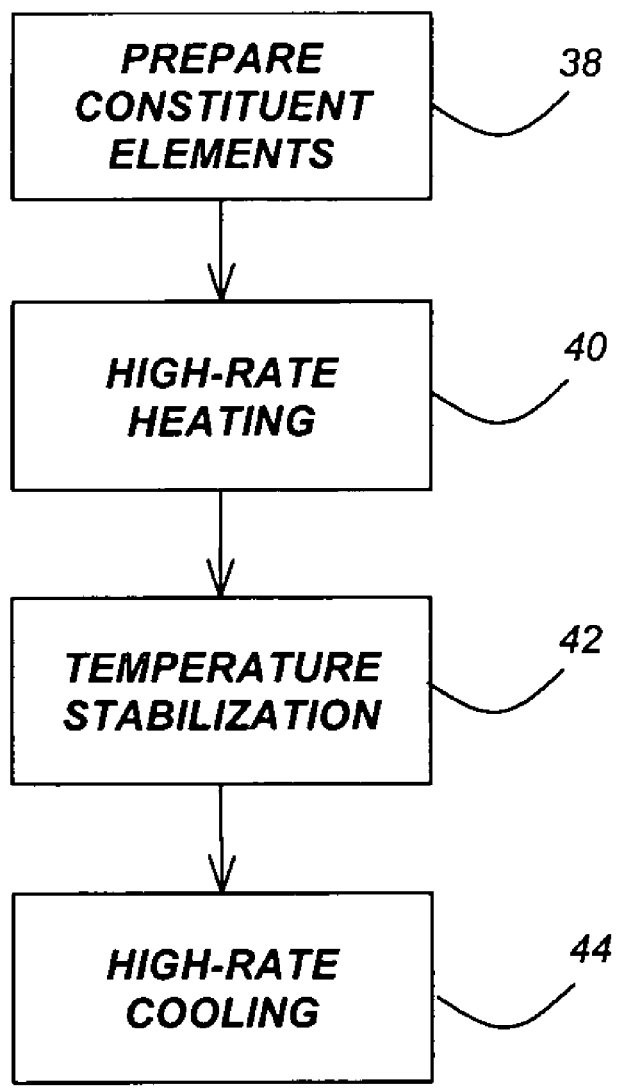
FIG. 6 is a flowchart that illustrates the processing steps used in the preferred embodiment of the present invention.

FIG. 6 is a flowchart that illustrates the processing steps for synthesizing nanoparticles used in the preferred embodiment of the present invention. These steps are typically performed using a single reaction vessel, continuous flow reactor or stopped flow reactor.

Block 38 represents the step of preparing one or more constituent elements at or near room temperature, wherein the constituent elements include ionic liquids that enhance formation rates of the nanoparticles, and the room temperature is below 100° C. Preferably, a dielectric constant of a main one of the constituent elements is 20 or higher.

Block 40 represents the step of heating the prepared constituent elements to an elevated temperature using high-rate heating, in order to create a reaction mixture. Preferably, the heating step is performed using microwave irradiation, and the high heating rate comprises a rate of 30° C./min or higher.

Block 42 represents the step of stabilizing the reaction mixture at the elevated temperature. Preferably, the elevated temperature is greater than 240° C.

Block 44 represents the step of cooling the stabilized reaction mixture to a reduced temperature using high-rate cooling. Preferably, the high cooling rate comprises a rate of 125° C./min or higher.

Figure 7:
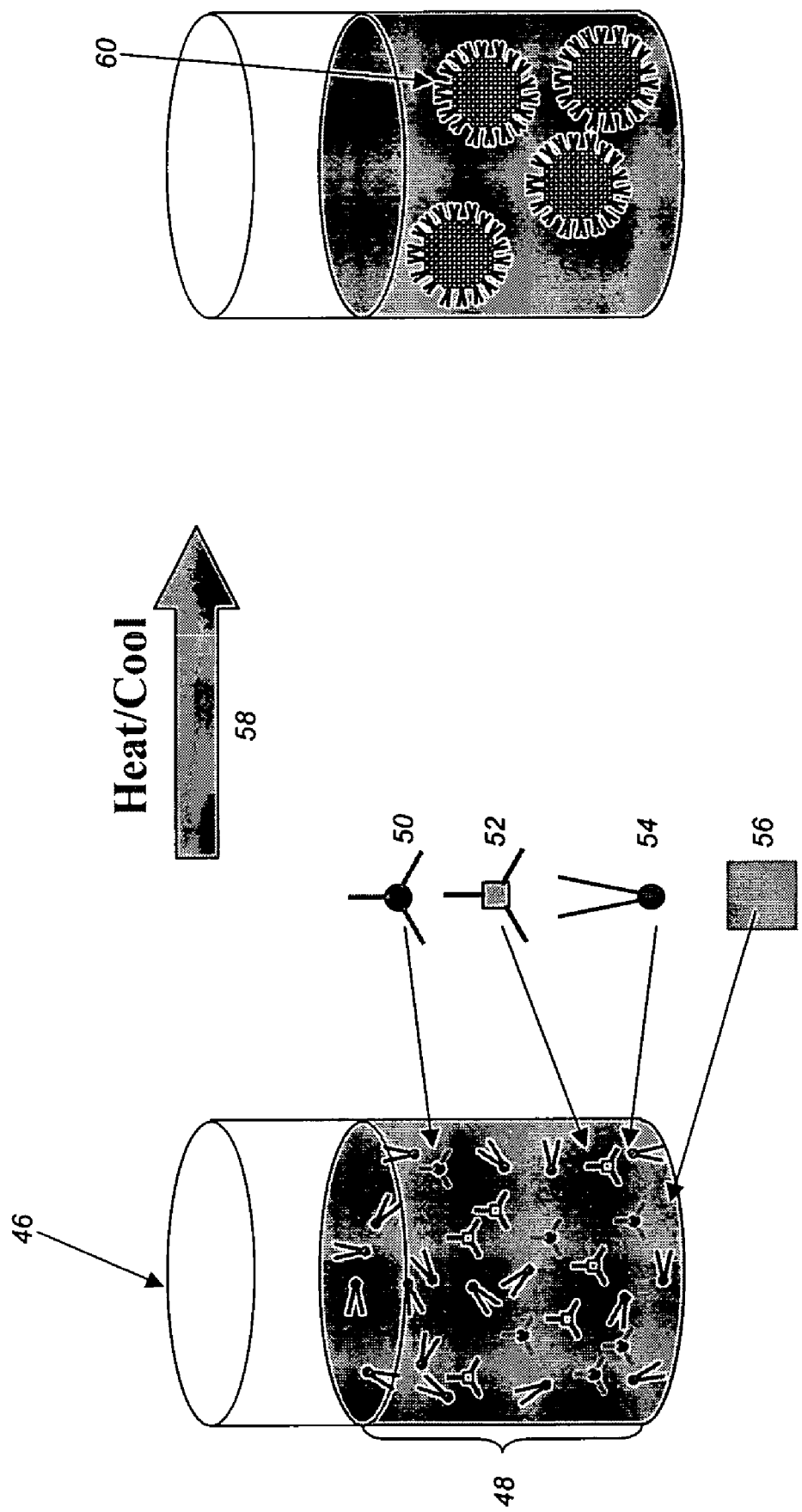
FIG. 7 is an illustration of the processing steps used in the preferred embodiment of the present invention.

FIG. 7 is an illustration of the processing steps for synthesizing nanoparticles used in the preferred embodiment of the present invention. As noted above, the reactor 46 typically comprises a single reaction vessel, continuous flow reactor or stopped flow reactor. The reactant 48 includes the constituent elements, such as one or more precursors 50 and 52 that contain elements that turn into nanoparticles, passivants 54, and/or solvents 56. Arrow 58 represents the heating/cooling process that creates the nanoparticles 60. The nanoparticles' 60 growth is controlled by adjustment of kinetic and thermodynamic barriers by power, temperature, time or additive.

16. REFERENCES

The following references are incorporated by reference herein:

[1] R. L. Wells, S. R. Aubuchon, S. S. Kher, M. S. Lube, P. S. White, Chemistry of Materials 1995, 7, 793.

[2] O. I. Micic, C. J. Curtis, K. M. Jones, J. R. Sprague, A. J. Nozik, Journal of Physical Chemistry 1994, 98, 4966.

[3] O. I. Micic, J. R. Sprague, C. J. Curtis, K. M. Jones, J. L. Machol, A. J. Nozik, H. Giessen, B. Fluegel, G. Mohs, N. Peyghambarian, Journal of Physical Chemistry 1995, 99, 7754.

[4] A. A. Guzelian, J. E. B. Katari, A. V. Kadavanich, U. Banin, K. Hamad, E. Juban, A. P. Alivisatos, R. H. Wolters, C. C. Arnold, J. R. Heath, Journal of Physical Chemistry 1996, 100, 7212.

[5] O. I. Micic, S. P. Ahrenkiel, A. J. Nozik, Applied Physics Letters 2001, 78, 4022.

[6] Z. A. Peng, X. G. Peng, Journal of the American Chemical Society 2001, 123, 183.

[7] S. L. Cumberland, K. M. Hanif, A. Javier, G. A. Khitrov, G. F. Strouse, S. M. Woessner, C. S. Yun, Chemistry of Materials 2002, 14, 1576.

[8] D. V. Talapin, A. L. Rogach, I. Mekis, S. Haubold, A. Kornowski, M. Haase, H. Weller, Colloids and Surfaces a-Physicochemical and Engineering Aspects 2002, 202, 145.

[9] D. Battaglia, X. G. Peng, Nano Letters 2002, 2, 1027

[10] J. J. Li, Y. A. Wang, W. Z. Guo, J. C. Keay, T. D. Mishima, M. B. Johnson, X. G. Peng, Journal of the American Chemical Society 2003, 125, 12567.

[11] I. Mekis, D. V. Talapin, A. Kornowski, M. Haase, H. Weller, Journal of Physical Chemistry B 2003, 107, 7454.

[12] E. M. Chan, R. A. Mathies, A. P. Alivisatos, Nano Letters 2003, 3, 199.

[13] H. Z. Wang, X. Y. Li, M. Uehara, Y. Yamaguchi, H. Nakamura, M. P. Miyazaki, H. Shimizu, H. Maeda, Chemical Communications 2004, 48.

[14] C. C. Landry, J. Lockwood, A. R. Barron, Chemistry of Materials 1995, 7, 699.

[15] A. V. Murugan, R. S. Sonawane, B. B. Kale, S. K. Apte, A. V. Kulkarni, Materials Chemistry and Physics 2001, 71, 98.

[16] H. Grisaru, O. Palchik, A. Gedanken, V. Palchik, M. A. Slifkin, A. M. Weiss, Journal of Materials Chemistry 2002, 12, 339.

[17] J. He, X. N. Zhao, J. J. Zhu, J. Wang, Journal of Crystal Growth 2002, 240, 389.

[18] T. Ding, J. R. Zhang, S. Long, J. J. Zhu, Microelectronic Engineering 2003, 66, 46.

[19] E. H. Hong, K. H. Lee, S. H. Oh, C. G. Park, Advanced Functional Materials 2003, 13, 961.

[20] C. Gabriel, S. Gabriel, E. H. Grant, B. S. J. Halstead, D. M. P. Mingos, Chemical Society Reviews 1998, 27, 213.

[21] E. T. Thostenson, T. W. Chou, Composites Part a-Applied Science and Manufacturing 1999, 30, 1055.

[22] D. A. Jones, T. P. Lelyveld, S. D. Mavrofidis, S. W. Kingman, N. J. Miles, Resources Conservation and Recycling 2002, 34, 75.

[23] A. Loupy, Microwaves in organic synthesis, Wiley-VCH, Weinheim; Cambridge, 2002.

[24] D. R. Lide, ed., CRC Handbook of Chemistry and Physics, 76th Ed., CRC 1995 pp. 6-159.

[25] Bogovikov, U. Y., et al., Zh. Obchei Himii 1969, 40, pp. 1957-1962.

17. CONCLUSION

This concludes the description of the preferred embodiment of the present invention. In summary, the present invention has shown that colloidal nanoparticles can be rapidly synthesized under high power microwave radiation to provide industrial scalability with no sacrifice to structural integrity or optical quality.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for synthesizing nanoparticles, comprising:
   preparing one or more constituent elements at a temperature below 100° C., wherein the constituent elements include ionic liquids that enhance formation rates of the nanoparticles;
   heating the prepared constituent elements using microwave irradiation to an elevated temperature at a rate of 30° C./min or higher, in order to create a reaction mixture;
   stabilizing the reaction mixture at the elevated temperature; and
   cooling the stabilized reaction mixture to a reduced temperature at a rate of 80° C./min or higher, so that the nanoparticles are synthesized.

2. The method of claim 1, wherein a dielectric constant of a main constituent element is 20 or lower.

3. The method of claim 1, wherein the constituent elements are prepared at or near a room temperature below 100° C.

4. The method of claim 1, wherein the heating step is performed using the microwave irradiation and one or more other heat sources.

5. The method of claim 1, wherein the prepared constituent elements are selectively heated via absorption of the microwave irradiation to the elevated temperature at a rate of 34° C./min or higher.

6. The method of claim 1, wherein the stabilized reaction mixture is cooled to the reduced temperature at a rate of 90° C./min or higher.

7. The method of claim 1, wherein the nanoparticles' growth is controlled by adjustment of kinetic and thermodynamic barriers by power, temperature, time or additive.

8. The method of claim 1, wherein the heating and cooling steps maintain an average diameter of 0.5 to 100 nm for the nanoparticles with a standard deviation of +/−20%.

* * * * *